(12) United States Patent
Miyoshi

(10) Patent No.: US 8,547,211 B2
(45) Date of Patent: Oct. 1, 2013

(54) ROUTE RETRIEVAL APPARATUS AND NAVIGATION APPARATUS

(75) Inventor: Masahiro Miyoshi, Kuwana (JP)

(73) Assignee: Denso Corporation, Kariya (JP)

( * ) Notice: Subject to any disclaimer, the term of this patent is extended or adjusted under 35 U.S.C. 154(b) by 337 days.

(21) Appl. No.: 13/104,272

(22) Filed: May 10, 2011

(65) Prior Publication Data

US 2011/0279255 A1    Nov. 17, 2011

(30) Foreign Application Priority Data

May 11, 2010    (JP) .................................. 2010-109557

(51) Int. Cl.
*B60Q 1/00*    (2006.01)
(52) U.S. Cl.
USPC ........ 340/425.5; 340/441; 701/400; 701/445; 701/448
(58) Field of Classification Search
USPC .............................................. 340/441, 425.5
See application file for complete search history.

(56) References Cited

U.S. PATENT DOCUMENTS

| | | | |
|---|---|---|---|
| 7,747,381 B2 | 6/2010 | Adachi | |
| 7,783,417 B2* | 8/2010 | Vavrus | 701/423 |
| 2005/0171649 A1 | 8/2005 | Adachi | |
| 2009/0024354 A1* | 1/2009 | Osaki et al. | 702/154 |
| 2009/0082952 A1 | 3/2009 | Narita et al. | |
| 2010/0090818 A1 | 4/2010 | Sekiyama et al. | |

FOREIGN PATENT DOCUMENTS

| | | |
|---|---|---|
| JP | A-05-189698 | 7/1993 |
| JP | A-10-197272 | 7/1998 |
| JP | B2-2871270 | 1/1999 |
| JP | A-2007-156704 | 6/2007 |
| JP | A-2008-107155 | 5/2008 |
| JP | A-2009-2847 | 1/2009 |
| JP | A-2009-101983 | 5/2009 |
| JP | A-2009-220762 | 10/2009 |
| JP | A-2009-250930 | 10/2009 |

OTHER PUBLICATIONS

Office Action mailed Jul. 10, 2012 in corresponding Japanese Application No. 2010-109557 (and English translation).

* cited by examiner

*Primary Examiner* — Kerri McNally
(74) *Attorney, Agent, or Firm* — Posz Law Group, PLC

(57) ABSTRACT

A route retrieval apparatus is disclosed. The route retrieval apparatus includes a storage component, a first correction component, a second correction component and a retrieval component. The storage component stores therein probe information to specify fuel consumption in each section, the probe information having been collected from probe vehicles. The first correction component corrects gradient information of each section based on the specified fuel consumption in the each section. The second correction component corrects a fuel cost of each section based on the gradient information corrected by the first correction component. The retrieval component retrieves, by using the fuel cost of the each section corrected by the second correction component, a route with a lowest total of the fuel costs from a departure point to a destination point.

9 Claims, 4 Drawing Sheets

FIG. 4
|  | GRADIENT INFO. | PROBE INFO (MEAN FUEL CONS.) | CORRECTED GRADIENT INFO. |
|---|---|---|---|
| LINK n-1 | 1 (%) | A (cc/m) | 1 (%) + F1 (%) |
| LINK n | 0.5 (%) | B (cc/m) | 0.5 (%) + F2 (%) |
| LINK n+1 | 0.3 (%) | C (cc/m) | 0.3 (%) + F3 (%) |
FIG. 5
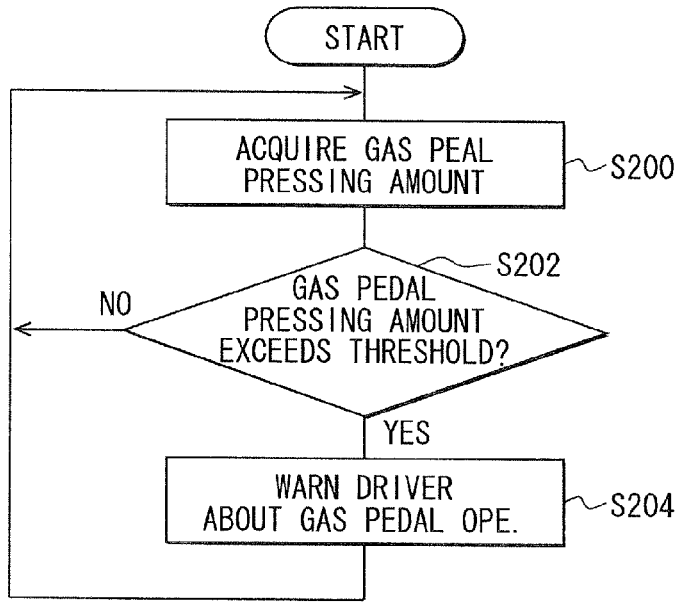
FIG. 6
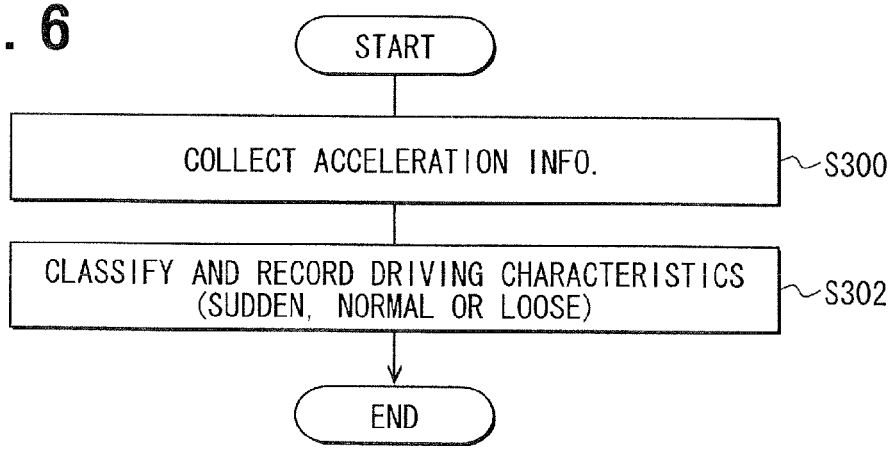

|  | GRADIENT INFO. | FUEL-CONS.-INFLUENCING-GRADIENT INDEX | FUEL-CONS.-INFLUENCING-GRADIENT INFO. (DRIVING CHARACTERISTIC FACTOR INTO CONSIDER.) |
|---|---|---|---|
| LINK n-1 | 1 (%) | F1 | F1×α or F1×β or F1×γ |
| LINK n | 0.5 (%) | F2 | F2×α or F2×β or F2×γ |
| LINK n+1 | 0.3 (%) | F3 | F3×α or F3×β or F3×γ |

ROUTE RETRIEVAL APPARATUS AND NAVIGATION APPARATUS

CROSS REFERENCE TO RELATED APPLICATION

The present application is based on and claims priority to Japanese Patent Application 2010-109557 filed on May 11, 2010, disclosure of which is incorporated herein by reference.

BACKGROUND

1. Technical Field

The present invention relates to a route retrieval apparatus and a navigation apparatus that calculate a fuel cost of each section (road section) based on road information contained in map data, and that retrieve a route with a lowest total of the fuel costs from a departure point and a destination point.

2. Description of Related Art

A known route retrieval apparatus calculates a fuel cost of each section based on road information contained in map data, and retrieves a route with a lowest total of the fuel costs from a departure point and a destination point. Such a route retrieval apparatus may correct a fuel cost by using gradient (road gradient) information of each section contained in the road information of the map data (see paragraphs [0026] to [0027] of JP-H5-189698A1 for example).

The inventor of the present application has found out the followings.

Since the gradient information contained in the road information is prescribed on a section-by-section basis (e.g., on a link-by-link basis), one section inclined at a constant gradient between both ends thereof and another section having up/down hills between both ends thereof are the same in the gradient indicated by the gradient information, as long the one section and the another section have the same height difference between the both ends. As a result, when the fuel cost is corrected by using the gradient information, the one section and the another section are the same in correction amount. However, in reality, when a vehicle travels on roads, the fuel consumption is less efficient in a section having up/down hills as compared with a wholly-flat section.

As can be seen from the above, the route retrieval apparatus is configured to calculate the fuel cost of each section based on the road information of the map data, correct the fuel cost of each section based on the gradient information of the each section contained in the road information, and retrieve a route with a lowest total of the fuel costs from a departure point to a destination point. In this configuration, since the route retrieval apparatus does not take into account the up/down hills in the course of a section, the route retrieval apparatus has low accuracy in retrieving a route with a lowest total of fuel costs.

SUMMARY

In view of the foregoing, it is an objective of the present disclosure to provide a route retrieval apparatus and a navigation apparatus that can retrieve a route with a lowest total of fuel costs with high accuracy.

According to a first aspect of the present disclosure, a route retrieval apparatus is provided to calculate respective fuel costs of sections of roads and retrieve a route with a lowest total of the fuel costs from a departure point to a destination point. The route retrieval apparatus includes a storage component, a first correction component, a second correction component and a retrieval component. The storage component is configured to store therein probe information to specify fuel consumption in each section, the probe information having been collected from runs of multiple probe vehicles. The first correction component is configured to correct gradient information of each section based on the specified fuel consumption in the each section, the specified fuel consumption being based on the probe information, the gradient information being contained in map data and indicating gradient of the each section. The second correction component is configured to correct a fuel cost of each section based on the gradient information corrected by the first correction component. The retrieval component is configured to retrieve, by using the fuel cost of the each section corrected by the second correction component, a route with a lowest total of the fuel costs from a departure point to a destination point.

According to the above route retrieval apparatus, the gradient information of each section contained in the map data is corrected based on the fuel consumption in the each section specified based on the probe information. Based on the corrected gradient information of each section, the fuel cost of each section is corrected. By using the corrected fuel cost of each section, the route with the lowest total of the fuel costs form the departure point to the destination point is retrieved. Thus, even when one section and another section are the same in height between two end of the section, the gradient information of such sections can be corrected based on the fuel consumption in the sections specified by the probe information, so that the one section and the another section are different in gradient. As a result, a route with a lowest total of the fuel costs can be retrieved with high accuracy.

According to a second aspect of the present disclosure, a navigation apparatus mounted to a subject vehicle and configured to carry out route guidance according to a guidance route is provided. The navigation apparatus includes the above-described route retrieval apparatus configured to retrieve the guidance route for the route guidance Further, the navigation apparatus includes: an accelerator pedal position acquisition component configured to acquire accelerator pedal pressing information to specify an amount of pressing down an accelerator pedal of the subject vehicle; and a warning component configured to warn a driver of the subject vehicle about an accelerator pedal operation in cases where the amount of pressing down the accelerator pedal specified from the accelerator pedal pressing information is determined to exceed a accelerator pedal pressing threshold for the section where the subject is located. The map data contains the accelerator pedal pressing threshold on a section-by-section basis.

According to the above navigation apparatus, when the amount of pressing down the accelerator pedal specified from the accelerator pedal pressing information is determined to exceed the accelerator pedal pressing threshold for the section where the subject is located, the driver of the subject vehicle is warned about his or her accelerator pedal operation. Therefore, it is possible to further reduce the fuel cost.

BRIEF DESCRIPTION OF THE DRAWINGS

The above and other objects, features and advantages relating to the present invention will become more apparent from the following detailed description made with reference to the accompanying drawings. In the drawings:

FIG. 4 is a diagram illustrating a relation among gradient information, probe information and corrected gradient information;

FIG. 5 is a flowchart illustrating a process for warning a driver about his or her accelerator pedal operation;

FIG. 6 is a flowchart illustrating a process for classifying driver's driving characteristic based on acceleration of a vehicle;

DETAILED DESCRIPTION OF EMBODIMENTS

Embodiments will be described with reference to the accompanying drawings.

(First Embodiment)

Figure 1:
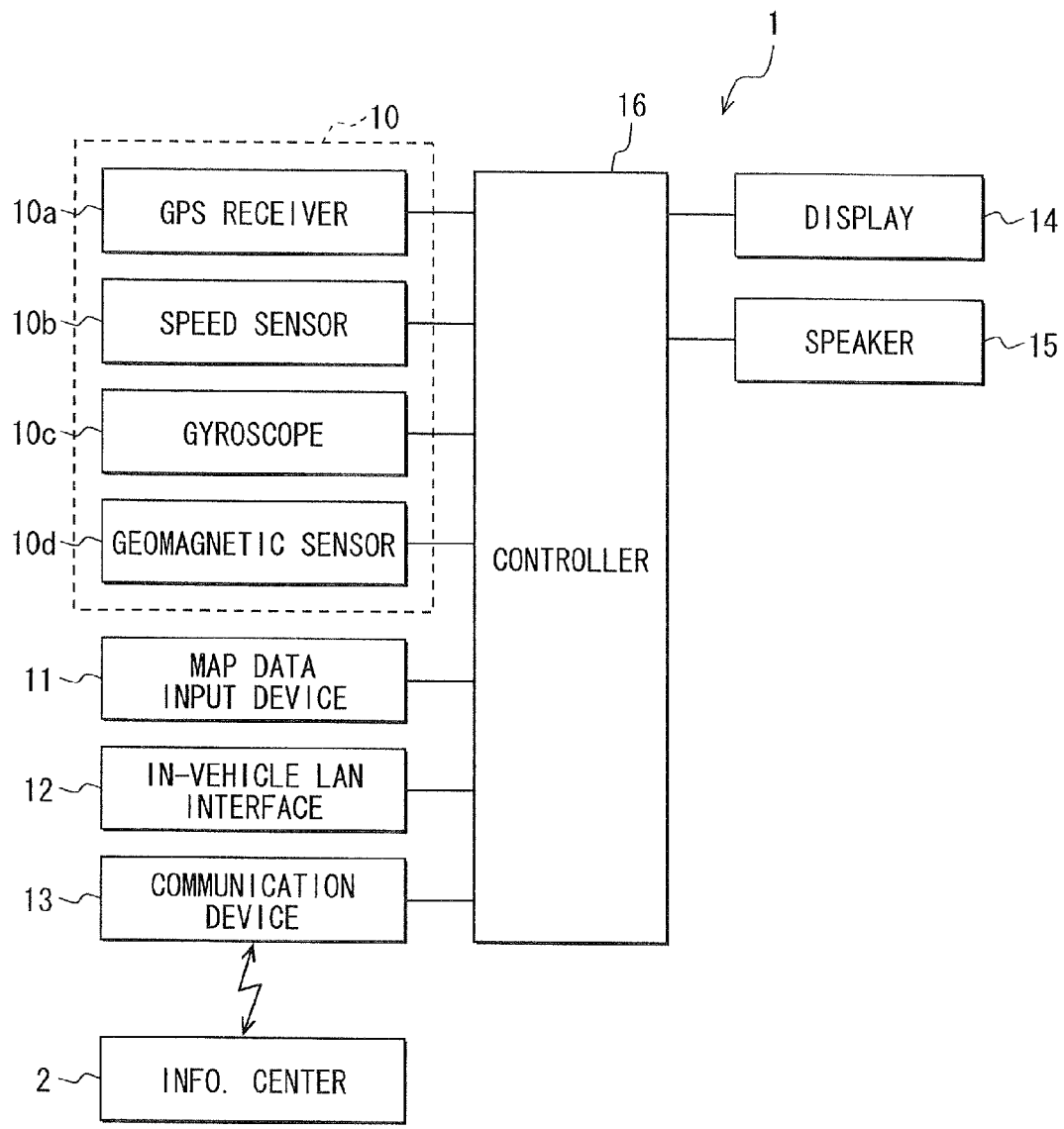
FIG. 1 is a block diagram illustrating a navigation apparatus according a first embodiment.

FIG. 1 illustrates a navigation apparatus 1 of a first embodiment. The navigation apparatus 1 functions as a route retrieval apparatus.

The navigation apparatus 1 is mounted a vehicle (called herein "subject vehicle") and includes a position locating device 10, a map data input device 11, an in-vehicle LAN interface 12, a communication device 13, a display device 14, a speaker 15 and a controller 16.

The position locating device 10 includes a GPS (global positioning system) receiver 10a, a vehicle speed sensor 10b, a gyroscope 10c and a geomagnetic sensor 10d, each of which outputs information for identification of present position of the vehicle. The position locating device 10 inputs the information for identification of the present position of the vehicle to the controller 16.

The map data input device 11 inputs map data, which is used for map display and route retrieval and which is stored in a non-volatile storage medium, to the controller 16. In response to a request from the controller 16, the map data input device 11 reads out a requested piece of map data from the non-volatile storage medium.

The map data includes a road data, a facility data, a background data and the like. The road data has information about link position, information about link type, information about road class of link indicating whether the link corresponds to toll road, general road, narrow street or the like, gradient information of sections indicating gradient of the section on a section-by-section basis (e.g., a link-by-link basis), information about node position, information about node type, information about a connection relation between nodes and links, and the like. The facility data has multiple records for each facility. The multiple records respectively correspond to name information indicating name of the facility, positional information indicating position of the facility, facility type information indicating type of the facility, and the like. The background data has information about position, shape and name of rivers, lakes, oceans, railway and facility, and the like.

The in-vehicle LAN interface 12 acts as an interface for connection to the in-vehicle LAN. Various ECUs such as an engine ECU (electronic control unit), a body ECU, a door ECU and the like are connected with the in-vehicle LAN.

The communication device 13 communicates with an outside of the navigation apparatus 1 via a wireless communication network (not shown). For example, the communication device 13 may perform telephone communication, data transmission or the like. In the present embodiment, the communication device 13 is communicatable with an information center 2 via the wireless communication network.

The display device 14 includes a display screen such as a liquid crystal display and the like. On the display screen, the display device 14 displays an image according to an image signal inputted from the controller 16. The speaker 15 outputs a sound (e.g., speech) according to a sound signal (e.g., speech signal) inputted from the controller 16.

The controller 16 is configured as a computer having a CPU (central processing unit), a RAM (random access memory), a ROM (read-only memory), a storage device, and an I/O (input/output) and the like. The controller 16 performs various processes using the CPU according to programs stored in the ROM.

The processes of the controller 16 include a present position identification process, a map display process, a destination retrieval process, a route retrieval process, a travel guidance process, and the like. The present position identification process is performed to identify the present position based on the information that the position locating device 10 inputs as a basis for identifying the present position. The map display process is performed to display, for example, such a map display screen that a vehicle position mark is superimposed on a map around the present position of the vehicle. The destination retrieval process is performed to retrieve a destination point according to user manipulation. The route retrieval process is performed to retrieve a guidance route from a departure point (e.g., the present position) to the destination point. The travel guidance process is performed to carry out travel guidance according to the guidance route.

In the present embodiment, in the route retrieval process, at least one retrieval condition is selectable from multiple retrieval conditions such as a toll road priority, a general road priority, a time priority, a distance priority, a fuel consumption priority and the like. The toll road priority gives the priority to travel on a toll road. The general road priority gives the priority to travel on a general road (non-toll road). The time priority gives the priority to a route with a minimum travel time from a departure point to a destination point. The distance priority gives the priority to a route with a minimum distance from a departure point to a destination. The fuel consumption priority gives the priority to a route with a minimum fuel cost from a departure point to a destination point.

The information center 2 includes a server for performing various computation operations. With the server, the information center 2 implements a service of providing traffic information, e.g., traffic jam information, construction work information, regulation information, and the like. The information center 2 further implements the following service. From a lot of specific probe vehicles (e.g., taxies etc.), the information center 2 receives probe information including a variety of data that is collected from runs of the multiple probe vehicles. Based on the received data, the information center 2 makes a database and provides a service of distributing information in the database in response to a request from a vehicle. In the present embodiment, the information center 2 receives information on fuel consumption in each section from the multiple probe vehicles, stores mean fuel consumption information of section in the database, and distributes the mean fuel consumption information of each section to a vehicle in response to a request from the vehicle. In the above, the mean fuel consumption information indicates an average of the fuel consumption of the multiple probe vehicles in each section and is obtained as the sum of the fuel consumption of the multiple probe vehicle divided by the number of probe vehicles.

In response to user operation (e.g., a command from a user), the controller 16 connects the communication device 13 to the information center 2, acquires the probe information from the information center 2 and records the acquired probe information in the storage medium. In the above, the probe information is information that has been collected from the runs of the probe vehicles to specify fuel consumption in each section. In the present embodiment, the probe information is the mean fuel consumption information described on a section-by-section basis.

In the present embodiment, when the controller 16 retrieves a route with a lowest total of the fuel costs from a departure point to a destination point, the controller 16 corrects the fuel cost of each section by not merely using the gradient information. Specifically, when the controller 16 retrieves a route with a lowest total of the fuel costs from a departure point to a destination point, the controller 16 performs a process to correct the gradient information based on the probe information stored in the storage device, and correct the fuel cost of each section by using the gradient information that has been corrected based on the probe information.

Figure 2:
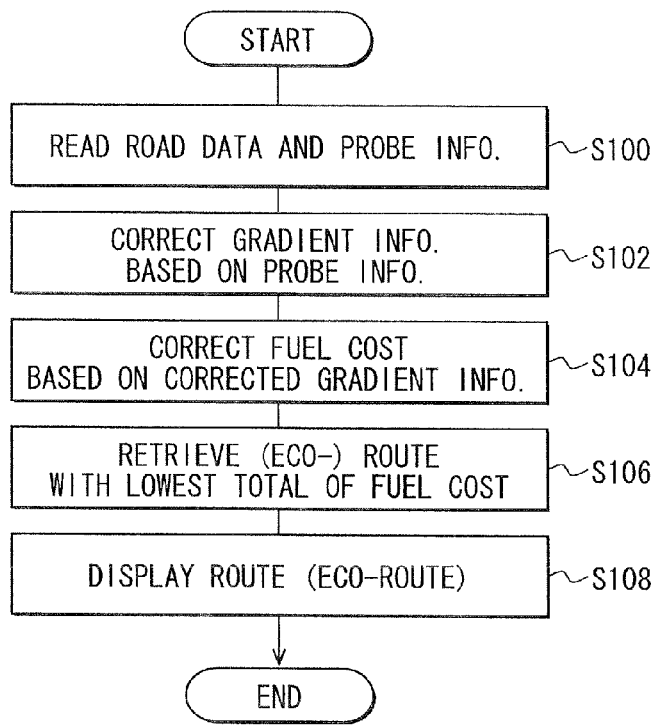
FIG. 2 is a flow chart illustrating a process for correcting gradient information of each section based on probe information and correcting a fuel cost of each section by using the corrected probe information.

The above process is more specifically illustrated in the flowchart of FIG. 2. When an ignition switch of the vehicle is put in an on state in response to user manipulation, the navigation apparatus 1 is put in an operating state. When a departure point and a destination point are specified in response to user manipulation, and when the navigation apparatus 1 is instructed to perform route retrieval using the fuel consumption priority as the retrieval condition in response to user manipulation, the controller 16 performs the process illustrated in FIG. 2.

At S100, from the map data input device 11, the controller 16 reads out the road data of a region covering the departure point and the destination point. Further, from the storage device, the controller 16 reads out the probe information of the region covering the departure point and the destination point. In the above, the probe information indicates the mean fuel consumption information on a section-by-section basis.

At S102, the controller 16 corrects the gradient information of each section based on the probe information. Specifically, a correction map used to correct the gradient information of each section based on the probe information (e.g., the mean fuel consumption information of each section) is stored in the ROM. By using this correction map, the controller 16 corrects the gradient information of each section based on the probe information.

Figure 3:
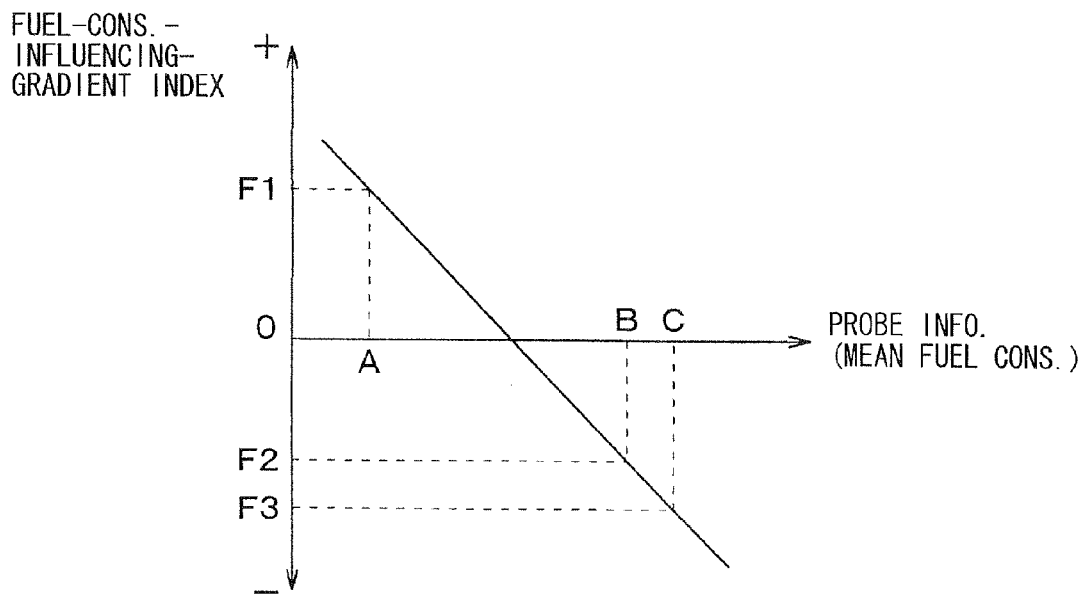
FIG. 3 is a diagram for explanation on a correction map.

Now, the correction map will be illustrated with reference to FIGS. 3 and 4. As shown in FIG. 3, the correction map prescribes a relation between the mean fuel consumption and fuel-consumption-influencing-gradient index F, where the fuel-consumption-influencing-gradient index F is an index indicating an influence of road gradient on fuel consumption). The relation is prescribed such that the fuel-consumption-influencing-gradient index F is larger as the mean fuel consumption is less efficient, and the fuel-consumption-influencing-gradient index F is smaller as the mean fuel consumption is more efficient.

The fuel-consumption-influencing-gradient index F1 corresponding to a mean fuel consumption A is larger than the fuel-consumption-influencing-gradient index F2 corresponding to a mean fuel consumption B. Further, the fuel-consumption-influencing-gradient index F2 corresponding to the mean fuel consumption B is larger than the fuel-consumption-influencing-gradient index F3 corresponding to a mean fuel consumption C.

In the present embodiment, the controller 16 corrects the gradient information of each section by adding (i) the fuel-consumption-influencing-gradient index F corresponding to the mean fuel consumption of the section to (ii) the gradient information of the section contained in the map data.

As shown in FIG. 4, when a first section corresponding to a link "n−1" has the gradient information 1 (%) and the mean fuel consumption A (cc/m), the controller 16 corrects the gradient information of the first section by adding (i) the fuel-consumption-influencing-gradient index F1 (%) corresponding to the mean fuel consumption A (cc/m), to (ii) the gradient information 1 (%). Accordingly, the corrected gradient information of the first section corresponding to the link "n−1" is given as 1+F1 (%).

When a second section corresponding to a link "n" has the gradient information 0.5 (%) and the mean fuel consumption B (cc/m), the controller 16 corrects the gradient information of the second section by adding (i) the fuel-consumption-influencing-gradient index F2 (%) corresponding to the mean fuel consumption B (cc/m) to (ii) the gradient information 0.5 (%). Accordingly, the corrected gradient information of the second section corresponding to the link "n" is given as 0.5+F2 (%).

Likewise, when a third section corresponding to a link "n+1" has the gradient information 0.3 (%) and the mean fuel consumption C (cc/m), the controller 16 corrects the gradient information of the third section by adding (i) the fuel-consumption-influencing-gradient index F3 (%) corresponding to the mean fuel consumption C (%) to the gradient information of 0.3 (%). Accordingly, the corrected gradient information of the third section corresponding to the link "n+1" is given as 0.3+F3 (%).

As can be seen from the above, the gradient information of each section is corrected so that as the fuel consumption in a section specified by the probe information is less efficient, the section is described as having a larger gradient. In other words, the gradient information of each section is corrected so that as the fuel consumption in the section specified by the probe information is less efficient, the fuel cost of the section is less efficient.

Now, explanation returns to FIG. 2. At S104, the controller 16 corrects the fuel cost of each section based on the corrected gradient information. In the present embodiment, the controller 16 corrects the fuel cost of each section in such manner that the controller 16 calculates an amount of the fuel consumption in each of sections from the departure point to the destination point, and corrects the calculated amount of the fuel consumption in the each of sections by using the gradient information corrected at S102. As for a technique for calculating an amount of the fuel consumption in each link and making a correction on it using road gradient, see JP-2009-79995A1 for example.

At S106, the controller 16 retrieves a guidance route (also called herein "eco-route") with a lowest fuel cost. For example, a route with a minimum total of the fuel consumption is specified as the guidance route.

At S108, the controller 16 displays the guidance route (eco-route) on the display screen of the display device 14, and the process illustrated in FIG. 2 is ended.

The map data of the navigation apparatus 1 stores therein an accelerator pedal pressing threshold on a section-by-section basis. The controller 16 determines whether an amount of pressing an accelerator pedal (also called gas pedal) of the subject vehicle exceeds the accelerator pedal pressing threshold for a section where the subject vehicle is located. Hereinafter, the amount of pressing the accelerator pedal of the subject vehicle is abbreviated as accelerator pedal pressing amount. When the controller 16 determines that the accelerator pedal pressing amount exceeds the accelerator pedal pressing threshold, the controller 16 performs a process for warning the driver about his or her accelerator pedal operation.

FIG. 5 is a flowchart illustrating the process for warning the driver about his or her accelerator pedal operation. When the navigation apparatus 1 is put in the operating state, the controller 16 starts performing the process illustrated in FIG. 5.

At S200, from the map data input device 11, the controller 16 acquires the information that is contained in the map data around the position of the subject vehicle to specify the accelerator pedal pressing threshold. Further, via the in-vehicle LAN interface 12, the controller 16 acquires information for specifying the actual accelerator pedal pressing amount. In the present embodiment, the controller 16 acquires a throttle valve opening as the information for specifying the actual accelerator pedal pressing amount.

At S202, the controller 16 determines whether the actual accelerator pedal pressing amount specified by the throttle valve opening exceeds the accelerator pedal pressing threshold for the section where the vehicle is presently located.

When the actual accelerator pedal pressing amount does not exceed the accelerator pedal pressing threshold for the section where the vehicle is presently located, the determination "NO" is made at S202, and the process returns to S200.

When the actual accelerator pedal pressing amount exceeds the accelerator pedal pressing threshold for the section where the vehicle is presently located, the determination "YES" is made at S202, the process proceeds to S204. At S204, the controller 16 warns the driver about his or her accelerator pedal operation. For example, a message indicating "the accelerator pedal is pressed down too much" is displayed by the display device 14 and outputted as sound from the speaker 15.

According to the above configuration, the storage device stores therein the probe information, which has been collected from the runs of the multiple probe vehicles to specify the fuel consumption in each section. Further, the gradient information of each section contained in the map data is corrected based on the fuel specified consumption in the each section, the specified consumption being based on the probe information stored in the storage device. Further, a fuel cost of each section is corrected based on the corrected gradient information of the each section. By using the corrected fuel cost of the each section, a route with a lowest total of the fuel costs from a departure point to a destination point is retrieved. Thus, for example, even when one section and another section are the same in height between opposite ends of the section, the gradient information of such sections are corrected based on the fuel consumption in the sections specified by the probe information, so that the one section and the another section are different in gradient (gradient information). As a result, a route with a lowest total of the fuel costs can be retrieved with high accuracy.

Moreover, according to the above configuration, the information center 2 collects the probe information from the multiple probe vehicles, which collect the probe information while traveling on sections of roads to specify the fuel consumption on a section-by-section basis. The navigation apparatus 1 acquires the probe information from the information center 2 and records the acquired probe information in the storage device. Therefore, based on the fuel consumption in each section identified from the latest probe information, the gradient information of each section contained in the map data can be corrected.

According to the above configuration, when it is determined that the gas pedal pressing amount in the subject vehicle exceeds the gas pedal pressing threshold for the section where the subject vehicle is located, the driver is warned about his or her gas pedal operation. Therefore, it is possible to further reduce fuel cost.

(Second Embodiment)

A second embodiment will be illustrated. The second embodiment and the first embodiment can be the same in construction of the navigation apparatus 1 shown in FIG. 1. In the first embodiment, the navigation apparatus 1 corrects the gradient information by using the probe information, which specifies the fuel consumption in each section. In the second embodiment, the navigation apparatus 1 corrects the gradient information by further performing the followings. The navigation apparatus 1 collects driving characteristic information to determine driver's driving characteristic influencing the fuel consumption of the subject vehicle, and classifies the driver's driving characteristic. According to this driver's driving characteristic, the gradient information is further corrected. In should be noted that like reference numerals are used to refer to like parts between embodiments.

In the present embodiment, the controller 16 performs a processes illustrated in FIG. 6 to perform the following. The controller 16 collects acceleration of the subject vehicle as the driving characteristic information, which is used to determine the driver's driving characteristic influencing the fuel consumption of the subject vehicle, and the controller 16 classifies the driver's driving characteristic based on statistical information of the collected acceleration.

FIG. 6 illustrates a flowchart of this process. When the subject vehicle is traveling, the controller 16 cyclically performs the process in FIG. 6 at predetermined intervals.

At S300, the controller 16 collects the acceleration of the subject. In the present embodiment, based on a vehicle speed signal inputted from the vehicle speed sensor 10b, the controller 16 collects the acceleration of the subject vehicle. The acceleration can be obtained by dividing a vehicle speed difference (speed change amount) by a collection time interval.

At S302, the controller 16 determines and classifies the driver's driving characteristic and records the classified driver's driving characteristic in the storage device. In the present embodiment, the driver's driving characteristic is classified into three categories, i.e., a sudden driving characteristic corresponding to a sudden driving operation, a normal driving characteristic corresponding to a normal driving operation, and a loose driving characteristic corresponding to a loose driving operation.

Figures 7, 8:
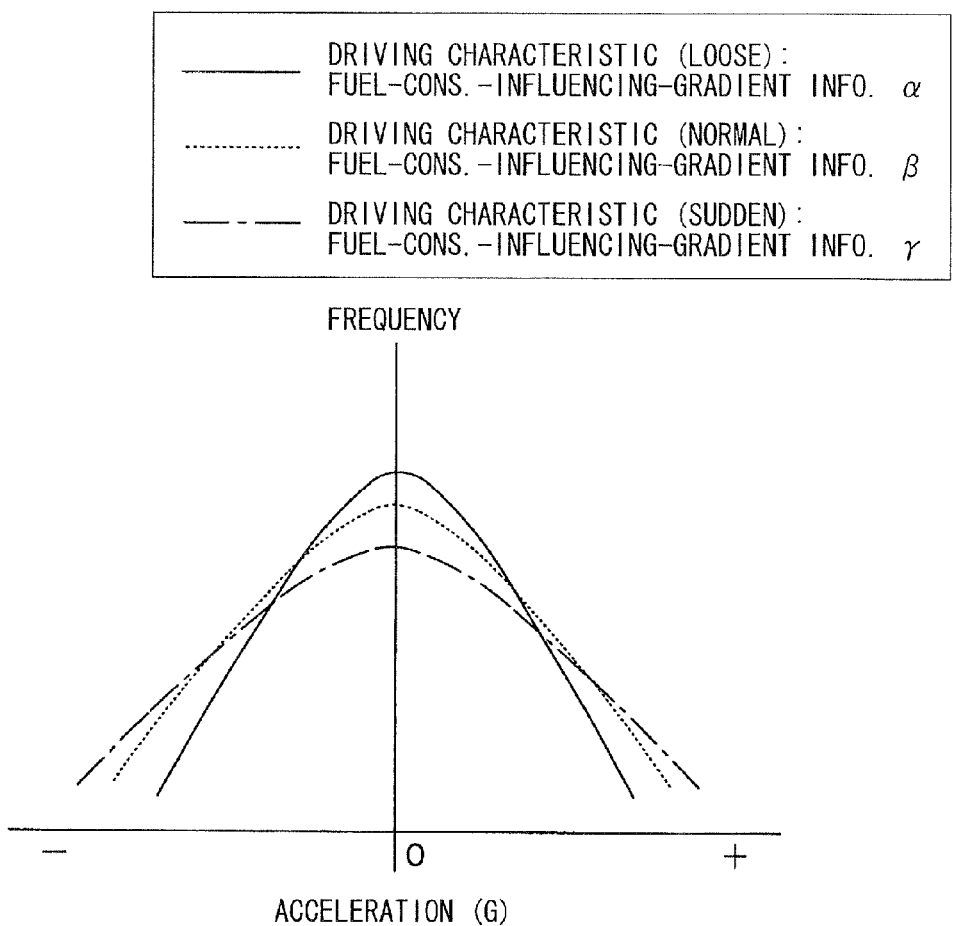
FIG. 7 is a diagram illustrating a relation between acceleration distribution and driving characteristic.
FIG. 8 is a diagram for explanation on a fuel-consumption-influencing-gradient index, which indicating an influence of gradient on fuel consumption.

FIG. 7 illustrates a relation between acceleration distribution and driving characteristic. As shown in FIG. 7, the driver's driving characteristic can be classified according to the acceleration distribution. Based on this relation shown in FIG. 7, the controller 16 determines the driver's driving characteristic that matches the acceleration distribution of the subject vehicle, and the controller 16 records the identified driving characteristic as the statistical information of the acceleration of the subject vehicle in the storage device. In the above way, the driver's driving characteristic is classified and recorded in the storage device.

In the present embodiment, the controller 16 performs a process similar to that shown in FIG. 2. In this regard, however, after the controller 16 corrects the gradient information of each section based on the probe information at S102, the controller 16 further corrects the gradient information according to the driver's driving characteristic classified at S302.

In the present embodiment, a diving characteristic factor for the loose driving characteristic, that for the normal driving characteristic and that for sudden driving characteristic are denoted by "α", "β" and "γ", respectively. The gradient information is corrected using the fuel-consumption-influencing-gradient index F multiplied by the diving characteristic factor that matches the driver's driving characteristic. In the present embodiment, the diving characteristic factors α, β, γ satisfy the following: $0<\alpha<\beta<\gamma$.

As shown in FIG. 8, as for the first section corresponding to the link "n−1" with the gradient information 1 (%) and the fuel-consumption-influencing-gradient index F1, fuel-consumption-influencing-gradient information is calculated to be the fuel-consumption-influencing-gradient index F1 multiplied by one of the diving characteristic factors α, β, γ, that matches the driver's driving characteristic. Accordingly, the gradient information of the first section (link "n−1") is corrected so that the corrected gradient information is given as "1+F1×α (%)", "1+F1×β (%)" or "1+F1×γ (%)".

As for the second section corresponding to the link "n" with the gradient information 0.5 (%) and the fuel-consumption-influencing-gradient index F2, the fuel-consumption-influencing-gradient information is calculated to be the fuel-consumption-influencing-gradient index F2 multiplied by one of the diving characteristic factors α, β, γ, that matches the driver's driving characteristic. Accordingly, the gradient information of the second section (link "n") is corrected so that the corrected gradient information is given as "0.5+F2×α (%)", "0.5+F2×β (%)" or "0.5+F2×γ (%)".

As for the third section corresponding to the link "n+1" with the gradient information 0.3 (%) and the fuel-consumption-influencing-gradient index F3, the fuel-consumption-influencing-gradient information is calculated to be the fuel-consumption-influencing-gradient index F3 multiplied by one of the diving characteristic factors α, β, γ, that matches the driver's driving characteristic. Therefore, the gradient information of the third section (link "n+1") is corrected so that the corrected gradient information is "0.5+F2×α (%)", "0.5+F2×β (%)" or "0.5+F2×γ (%)".

In this way, the gradient information is corrected so that as the driving characteristic of the driver in a section is less efficient in the fuel consumption, the fuel cost of the section is less efficient.

According to the above configuration, the driving characteristic information, which is used to determine the driver's driving characteristic influencing the fuel consumption of the subject vehicle, is collected. Based on the collected driving characteristic information, the driver's driving characteristic of the subject vehicle is determined and classified. The gradient information is corrected, so that as the driving characteristic of the driver in a section is less efficient in the fuel consumption, the corrected gradient information causes the fuel cost of the section to be less efficient. Accordingly, the corrected gradient information of each section reflects the driver's driving characteristic in the section that may have a positive or negative influence on the fuel cost. Therefore, a route with a lowest total of fuel costs can be retrieved with higher accuracy.

(Third Embodiment)

A third embodiment will be illustrated. In the second embodiment, the driver's driving characteristic is classified according to the acceleration distribution of the subject vehicle. However, for example, depending on whether the subject vehicle is traveling on an up-hill or a down-hill, the driver's driving characteristic may change. The driver classified as the loose driving characteristic may not always have the loose driving characteristic in the up-hill section (or the down-hill).

A third embodiment is made in view of the foregoing. In the third embodiment, the controller 16 determines whether the subject is traveling on an up-hill or a down-hill, based on the signal inputted from the gyroscope 10*c*. The controller 16 collects the driving characteristic information (which is used to determine the driver's driving characteristic) while making a distinction between (i) the driving characteristic information used to determine the driver's driving characteristic at the up-hill and (ii) that at the down-hill. The controller 16 classifies the driver's driving characteristic while making a distinction between the driver's driving characteristic at the up-hill and that at the down-hill.

For example, the driver's driving characteristic in the up-hill section may be classified as the sudden driving characteristic in the following cases etc. A first case is that the gas pedal pressing amount is larger than a predetermined threshold or the acceleration is larger than a predetermined threshold when the subject vehicle is traveling on the up-hill. A second case is that, although the map data and the present position of the subject indicate that the subject vehicle is approaching an end of the up-hill, the acceleration is larger than a predetermined threshold.

The driver's driving characteristic in the up-hill section may be classified as the loose driving characteristic in the following case etc. The gas pedal pressing amount is smaller than a predetermined threshold when the subject vehicle is traveling on the up-hill.

The driver's driving characteristic in the down-hill section may be classified as the sudden driving characteristic in the following case etc. The gas pedal pressing amount is larger than a predetermined threshold when the subject vehicle is traveling on the down-hill.

The driver's driving characteristic in the down-hill section may be classified as the loose driving characteristic in the following case etc. Frequency of fuel injection stop caused by the use of engine brake (e.g., low gear) is larger than a predetermined threshold.

As can be seen from the above, although the driver's driving characteristic may vary between the up-hill section and the down-hill section, the controller 16 of the present embodiment classifies the driving characteristic influencing the fuel consumption of the subject vehicle while making a distinction between when the subject vehicle is traveling on the up-hill section and when the subject vehicle is traveling on the down-hill section. Then, the controller 16 further corrects the gradient information while making a distinction between the gradient information of the up-hill section and that of the down-hill section. Therefore, it becomes possible to correct the gradient information in a manner suited to the driver's driving characteristics at the up-hill and the down-hill.

(Other Embodiments)

In the above-described embodiments, the navigation apparatus 1 uses an amount of the fuel consumption in each section to calculate a fuel cost of the each section, and retrieves a guidance route with a lowest total of the fuel costs. When the navigation apparatus 1 is mounted to, for example, an electric vehicle (EV) using a motor as a travel power source, the navigation apparatus 1 may uses an electric power consumption amount of the motor in each section to calculate a fuel cost of the each section, and retrieves a guidance route with a lowest total of the fuel costs.

In the first embodiment, from the information center 2, the navigation apparatus 1 acquires mean fuel consumption information of each section as the probe information for specifying the fuel consumption in the each section and corrects the gradient information by using the acquired probe information. When the navigation apparatus 1 is mounted to, for example, the electric vehicle (EV), the probe information may be used to specify a mean electric power consumption amount of the motor in each section, and the gradient information may be corrected by using this probe information. That is, in the case of the electric vehicle, the fuel consumption is power consumption. The fuel cost is a power cost.

In the second embodiment, the navigation apparatus 1 collects the driving characteristic information (e.g., acceleration), which is used to determine the driver's driving characteristic having an influence on the fuel consumption of the subject vehicle. Based on the collected driving characteristic information, the navigation apparatus 1 determines and classifies the driving characteristic of the driver of the subject vehicle. The navigation apparatus 1 corrects the gradient information so that as the driving characteristic of the driver of the subject vehicle in a section is less efficient in fuel consumption, the gradient information of the section causes the fuel cost of the section to be smaller (less efficient). In another embodiment, the navigation apparatus 1 may transmit the driving characteristic information, which is used to determine the driver's driving characteristic, to the information center 2 via the communication device 13 as well as the information used to specify the fuel consumption amount in each section.

In the second embodiment, the navigation apparatus 1 collects the acceleration of the subject vehicle as the driving characteristic information, which is used to determine the driver's driving characteristic influencing the fuel consumption of the subject vehicle. Alternatively, the navigation apparatus 1 may collect gas pedal pressing amount, fuel injection amount or the like as the driving characteristic information.

In the above embodiments, the navigation apparatus 1 is an example of a route retrieval apparatus. The storage device of the controller 16 is an example of a storage means or component. The controller 16, which is configured to perform S102, is an example of a first correction means or component. The controller 16, which is configured to perform S104, is an example of a second correction means or component. The controller 16, which is configured to perform S106, is an example of a retrieval means or component. The communication device 13 is an example of a communication means or component. The controller 16, which is configured to perform S300, is an example of an information collection means or component. The controller 16, which is configured to perform S302, is an example of a driving characteristic classification means or component. The controller 16, which is configured to perform S200, is an example of a gas pedal position information acquisition means or component. The controller 16, which is configured to perform S202 and S204, is an example of a warning means or component.

According to a first example of the present disclosure, a route retrieval apparatus for calculating respective fuel costs of sections of roads and retrieving a route with a lowest total of the fuel costs from a departure point to a destination point may be configured in the following way. The route retrieval apparatus includes a storage component, a first correction component, a second correction component and a retrieval component. The storage component is configured to store therein probe information to specify fuel consumption in each section, the probe information having been collected from runs of multiple probe vehicles. The first correction component is configured to correct gradient information of each section based on the specified fuel consumption in the each section, the specified fuel consumption being based on the probe information, the gradient information being contained in map data and indicating gradient of the each section. The second correction component is configured to correct a fuel cost of each section based on the gradient information corrected by the first correction component. The retrieval component is configured to retrieve, by using the fuel cost of the each section corrected by the second correction component, a route with a lowest total of the fuel costs from a departure point to a destination point.

According to the above route retrieval apparatus, the gradient information of each section contained in the map data is corrected based on the fuel consumption in the each section specified based on the probe information. Based on the corrected gradient information of each section, the fuel cost of each section is corrected. By using the corrected fuel cost of each section, the route with the lowest total of the fuel costs form the departure point to the destination point is retrieved. Thus, even when one section and another section are the same in height between two end of the section, the gradient information of such sections can be corrected based on the fuel consumption in the sections specified by the probe information, so that the one section and the another section are different in gradient. As a result, a route with a lowest total of the fuel costs can be retrieved with high accuracy.

The above retrieval apparatus may be configured as follow. The first correction component is configured to correct the gradient information of each section, so that as the fuel consumption specified by the probe information is less efficient in the section, the corrected gradient information causes the fuel cost of the section to be less efficient.

The above retrieval apparatus may be configured as follow. The probe information is mean fuel consumption information, which indicates an average of the fuel consumption of the multiple probe vehicles.

The above retrieval apparatus may further include a communication component configured to communicate with an information center, the information center being configured to collect the probe information from the multiple probe vehicles to specify the fuel consumption in each section. In addition, the communication component may be further configured to acquire the probe information from the information center. The acquired probe information may be stored in the storage component.

According to the above configuration, the probe information acquired from the information center, which collects the probe information from the multiple probe vehicles to specify the fuel consumption on a section-by-section basis, is recorded and stored. Therefore, the gradient information of each section contained in the map data can be corrected based on the fuel consumption in each section identified from the latest probe information.

The above route retrieval apparatus may mounted to a subject vehicle and may further include: an information collection component configured to collect driving characteristic information to determine a driving characteristic of a driver of the subject vehicle, which influences the fuel consumption of the subject vehicle; and a driving characteristic classification component configured to determine and classify the driving characteristic of the driver based on the driving characteristic information collected by the information collection component. The first correction component may be further configured to correct the gradient information further based on the driving characteristic of the driver, so that as the driving characteristic of the driver in the section is less efficient in the fuel consumption, the corrected gradient information causes the fuel cost of the section to be less efficient.

According the above configuration, the gradient information can corrected so that as the driving characteristic of the driver in a section is less efficient in the fuel consumption, the corrected gradient information causes the fuel cost of the section to be less efficient. Therefore, a route with a lowest total of the fuel costs can be retrieved with higher accuracy.

The above retrieval apparatus may be configured such that the driving characteristic information, which is used to determine the driving characteristic influencing the fuel consumption of the subject vehicle, includes statistical information on acceleration of the subject vehicle.

The above retrieval apparatus may be configured in the following way. The information collection component is further configured to collect the driving characteristic information while making a distinction between the driving characteristic information at an up-hill section and that at a down-hill section. The driving characteristic classification component is further configured to determine and classify the driver's driving characteristic influencing the fuel consumption, while making a distinction between the driver's driving characteristic when the subject vehicle is traveling on the up-hill section and that when the subject vehicle is traveling on the down-hill section. The first correction component is further configured to correct the gradient information while making a distinction between the gradient information of the up-hill section and that of the down-hill section.

The driver's driving characteristic may vary between the up-hill section and the down-hill section. According to the above configuration, however, it is possible to correct the gradient information in a manner suited to the driver's driving characteristic at the up-hill and that at the down-hill.

According to a second example of the present disclosure, a navigation apparatus mounted to a subject vehicle and configured to carry out route guidance according to a guidance route may be configured in the following way. The navigation apparatus includes the above-described route retrieval apparatus configured to retrieve the guidance route for the route guidance Further, the navigation apparatus includes: an accelerator pedal position acquisition component configured to acquire accelerator pedal pressing information to specify an amount of pressing down an accelerator pedal of the subject vehicle; and a warning component configured to warn a driver of the subject vehicle about an accelerator pedal operation in cases where the amount of pressing down the accelerator pedal specified from the accelerator pedal pressing information is determined to exceed a accelerator pedal pressing threshold for the section where the subject is located. The map data contains the accelerator pedal pressing threshold on a section-by-section basis.

According to the above navigation apparatus, when the amount of pressing down the accelerator pedal specified from the accelerator pedal pressing information is determined to exceed the accelerator pedal pressing threshold for the section where the subject is located, the driver of the subject vehicle is warned about his or her accelerator pedal operation. Therefore, it is possible to further reduce the fuel cost.

Additional advantages and modifications will readily occur to those skilled in the art. The invention in its broader terms is therefore not limited to the specific details, representative apparatus, and illustrative examples shown and described.

What is claimed is:

1. A route retrieval apparatus for calculating respective fuel costs of sections of roads and retrieving a route with a lowest total of the fuel costs from a departure point to a destination point, the route retrieval apparatus comprising:
    a storage component configured to store therein probe information to specify fuel consumption in each section, the probe information having been collected from runs of a plurality of probe vehicles;
    a first correction component configured to correct gradient information of each section based on the specified fuel consumption in the each section, the specified fuel consumption being based on the probe information, the gradient information being contained in map data and indicating gradient of the each section;
    a second correction component configured to correct a fuel cost of each section based on the gradient information corrected by the first correction component; and
    a retrieval component configured to retrieve, by using the fuel cost of the each section corrected by the second correction component, a route with a lowest total of the fuel costs from a departure point to a destination point.

2. The route retrieval apparatus according to claim 1, wherein:
    the first correction component is configured to correct the gradient information of each section, so that as the fuel consumption specified by the probe information is less efficient in the section, the corrected gradient information causes the fuel cost of the section to be less efficient.

3. The route retrieval apparatus according to claim 1, wherein:
    the probe information is mean fuel consumption information, which indicates an average of the fuel consumption of the plurality of probe vehicles.

4. The route retrieval apparatus according to claim 1, further comprising:
    a communication component configured to communicate with an information center, the information center being configured to collect the probe information from the plurality of probe vehicles to specify the fuel consumption in each section,
    wherein:
    the communication component is further configured to acquire the probe information from the information center; and
    the acquired probe information is stored in the storage component.

5. The route retrieval apparatus according to claim 1, wherein the route retrieval apparatus is mounted to a subject vehicle, the route retrieval apparatus further comprising:
    an information collection component configured to collect driving characteristic information to determine a driving characteristic of a driver of the subject vehicle, wherein the driving characteristic influences the fuel consumption of the subject vehicle; and
    a driving characteristic classification component configured to determine and classify the driving characteristic of the driver based on the driving characteristic information collected by the information collection component,
    wherein:
    the first correction component is further configured to correct the gradient information further based on the driving characteristic of the driver, so that as the driving characteristic of the driver in the section is less efficient in the fuel consumption, the corrected gradient information causes the fuel cost of the section to be less efficient.

6. The route retrieval apparatus according to claim 5, wherein:
    the driving characteristic information, which is used to determine the driving characteristic influencing the fuel consumption of the subject vehicle, includes statistical information on acceleration of the subject vehicle.

7. The route retrieval apparatus according to claim 5, wherein:
    the information collection component is further configured to collect the driving characteristic information while making a distinction between the driving characteristic information at an up-hill section and that at a down-hill section;

the driving characteristic classification component is further configured to determine and classify the driver's driving characteristic influencing the fuel consumption, while making a distinction between the driver's driving characteristic when the subject vehicle is traveling on the up-hill section and that when the subject vehicle is traveling on the down-hill section; and the first correction component is further configured to correct the gradient information while making a distinction between the gradient information of the up-hill section and that of the down-hill section.

8. The route retrieval apparatus according to claim 1, wherein:

the route retrieval apparatus is mounted to an electric vehicle;

the fuel consumption is power consumption; and the fuel cost is a power cost.

9. A navigation apparatus mounted to a subject vehicle and configured to carry out route guidance according to a guidance route, the navigation apparatus comprising:

a route retrieval apparatus recited in claim 1, the route retrieval apparatus being configured to retrieve the guidance route for the route guidance;

an accelerator pedal position acquisition component configured to acquire accelerator pedal pressing information to specify an amount of pressing down an accelerator pedal of the subject vehicle; and a warning component configured to warn a driver of the subject vehicle about an accelerator pedal operation in cases where the amount of pressing down the accelerator pedal specified from the accelerator pedal pressing information is determined to exceed a accelerator pedal pressing threshold for the section where the subject is located, wherein:

the map data contains the accelerator pedal pressing threshold on a section-by-section basis.

* * * * *